(12) United States Patent
Inabattini et al.

(10) Patent No.: US 11,403,130 B2
(45) Date of Patent: Aug. 2, 2022

(54) METHOD AND APPARATUS FOR WORKLOAD VOLATILITY MANAGEMENT IN CLOUD COMPUTING

(71) Applicant: VMWARE, INC., Palo Alto, CA (US)

(72) Inventors: Sai Inabattini, Bangalore (IN); Priyanka Gayam, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 229 days.

(21) Appl. No.: 16/727,951

(22) Filed: Dec. 27, 2019

(65) Prior Publication Data

US 2021/0124605 A1    Apr. 29, 2021

(30) Foreign Application Priority Data

Oct. 24, 2019 (IN) .............................. 201941043303

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
None
See application file for complete search history.

(56) References Cited

U.S. PATENT DOCUMENTS

| 2014/0165063 | A1* | 6/2014 | Shiva ................ G06F 9/45533 718/1 |
| 2014/0173593 | A1* | 6/2014 | Padala ................ G06F 9/5088 718/1 |
| 2015/0355924 | A1* | 12/2015 | Holla ................ G06F 9/45558 718/1 |
| 2017/0168905 | A1* | 6/2017 | Wu .......................... G06F 9/50 |
| 2018/0060106 | A1* | 3/2018 | Madtha .................. H04L 41/12 |

* cited by examiner

*Primary Examiner* — Lewis A Bullock, Jr.
*Assistant Examiner* — Melissa A Headly
(74) *Attorney, Agent, or Firm* — Loza & Loza, LLP

(57) ABSTRACT

System and computer-implemented method for managing workload volatility in a cloud architecture including a plurality of computing instances in a group of hosts use volatiltiy factors to identify first and second hosts and then a first virtual computing instance in the first host. A workload metric associated with the group of hosts is used to identify a second virtual computing instance in the second host to be swapped with the first virtual computing instance in the first host. The first and second virtual computing instances are swapped so that the first virtual computing instance is migrated from the first host to the second host and the second virtual computing instance is migrated from the second host to the first host.

20 Claims, 7 Drawing Sheets

| Scenario | Before VB (Hosts load [%]) | | | | After VB (Hosts load [%]) | | | |
|---|---|---|---|---|---|---|---|---|
| | Host 1 | Host 2 | Host 3 | Host 4 | Host 1 | Host 2 | Host 3 | Host 4 |
| 602_A All volatile VMs increases in workload | 90 | 50 | 50 | 50 | 60 | 60 | 60 | 60 |
| 602_B All volatile VMs decreases in workload | 10 | 50 | 50 | 50 | 40 | 40 | 40 | 40 |
| 602_C Half of the volatile VMs increase and half decrease | 50 | 50 | 50 | 50 | 60 | 60 | 40 | 40 |
| 602_D 3 of the volatile VMs increase and 1 decreases | 70 | 50 | 50 | 50 | 60 | 60 | 60 | 40 |
| 602_E 3 of the volatile VMs decrease and 1 increases | 30 | 50 | 50 | 50 | 40 | 40 | 40 | 60 |

FIG. 6

METHOD AND APPARATUS FOR WORKLOAD VOLATILITY MANAGEMENT IN CLOUD COMPUTING

RELATED APPLICATIONS

Noon Benefit is claimed under 35 U.S.C. 119(a)-(d) to Foreign Application Serial No. 201941043303 filed in India entitled "METHOD AND APPARATUS FOR WORKLOAD VOLATILITY MANAGEMENT IN CLOUD COMPUTING", on Oct. 24, 2019, by VMWARE, Inc., which is herein incorporated in its entirety by reference for ail purposes.

BACKGROUND

Cloud architectures are used in cloud computing and cloud storage systems for offering infrastructure as a service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual computing instances (VCIs), e.g., virtual machines (VMs), and logical networks.

With increasing adaptation of cloud computing and cloud storage by enterprises, resource management for cloud architectures is never more important than it is now. For cloud services where users are charged on a per node usage, efficient utilization of infrastructure may result in significant savings.

One approach for resource management is to distribute VMs across nodes in a cloud architecture based on their utilization. Utilization of each node is determined based on a sum of all workloads of VMs on that node. For example, 2 hosts may be examined, where a first host has a 10% utilization and a second host has a 90% utilization, where a VM on the second host is responsible for 40% of the utilization (a percentage that is greater than any other VM on the second host). In this case, the resource management approach would move the VM from the second host to the first host, thereby distributing the VMs between the first host and the second host so that both hosts would be at 50% utilization. The resource management approach would attempt to reduce utilization on a host as quickly as possible by moving a VM responsible for the highest utilization, which is the VM with the highest workload, off of that host. This resource, management approach is most effective when workloads on VMS are more or less stable.

However, when workloads are unstable (i.e., workloads keep varying), use of the above-described resource management approach may result in constant, non-stop live migration of VMs to keep the workload, and therefore amount of utilization for each node, evenly distributed. For example, in a typical datacenter cluster, there is a mix of workload variation, where workload on a percentage of VMs varies greatly ("noisy") while the rest of the VMs have workloads that are stable. When the datacenter cluster is managed by a load balancer (LB), the LB will try to distribute the workload across the nodes as and when there is an imbalance in the workload distribution. If the workload variation/noise of VMs is concentrated to only a few hosts (noisy nodes) in the cluster, using the LB cannot help much There is generally no notion of noise or a noisy host for the LB. Consequently, when utilization decreases in a noisy host because the workload of one or more VMs decreases, the LB moves VMs into the noisy hosts, and when utilization increases again, the LB may move some Vols out. This will keep repeating, resulting in constant movement of VMs. In addition, there is no guarantee that the LB will distribute the noisy VMs efficiently since load balancing works on balancing workload but not management of noise.

It would be desirable to be able to address one or more of the challenges described above.

SUMMARY

System and computer-implemented method in a cloud architecture having a group of hosts, each including a plurality of virtual computing instances, the method including identifying a first host from the group of hosts, the first host having a first host volatility factor greater than other hosts in the group of hosts; identifying a first virtual computing instance in the first host, the first virtual computing instance having a first virtual computing instance volatility factor greater than other virtual computing instances in the first host; identifying a second host from the group of hosts, the second host having a second host volatility factor less than other hosts in the group of hosts; identifying a second virtual computing instance in the second host to be swapped with the first virtual computing instance in the first host based on a workload metric associated with the group of hosts; and swapping the first virtual computing instance and the second virtual computing instance.

A computer-implemented method in a cloud architecture having a group of hosts, each including a plurality of virtual computing instances, the method including identifying a first host from the group of hosts, the first host having a first host volatility factor greater than other hosts in the group of hosts; identifying a first virtual computing instance in the first host, the first virtual computing instance having a first virtual computing instance volatility factor greater than other virtual computing instances in the first host; identifying a second host from the group of hosts, the second host having a second host volatility factor less than other hosts in the group of hosts; identifying a second virtual computing instance in the second host to be swapped with the first virtual computing instance in the first host based on a workload metric associated with the group of hosts; and swapping the first virtual computing instance and the second virtual computing instance.

A system in a cloud architecture including a group of hosts, each having a plurality of virtual computing instances, the system including memory and one or more processors. The one or more processors are configured to identify a first host from the group of hosts, the first host having a first host volatility factor greater than other hosts in the group of hosts; identify a first virtual computing instance in the first host, the first virtual computing instance having a first virtual computing instance volatility factor greater than other virtual computing instances in the first host; identify a second host from the group of hosts, the second host having a second host volatility factor less than other hosts in the group of hosts; identify a second virtual computing instance in the second host to be swapped with the first virtual computing instance in the first host based on a workload metric associated with the group of hosts; and swap the first virtual computing instance and the second virtual computing instance.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6 is a chart with example scenarios of how the volatility balancing process of FIG. 2 may be used to benefit volatility distribution over a group of hosts.

Throughout the description, similar reference numbers may be used to identify similar elements.

DETAILED DESCRIPTION

Figure 1:
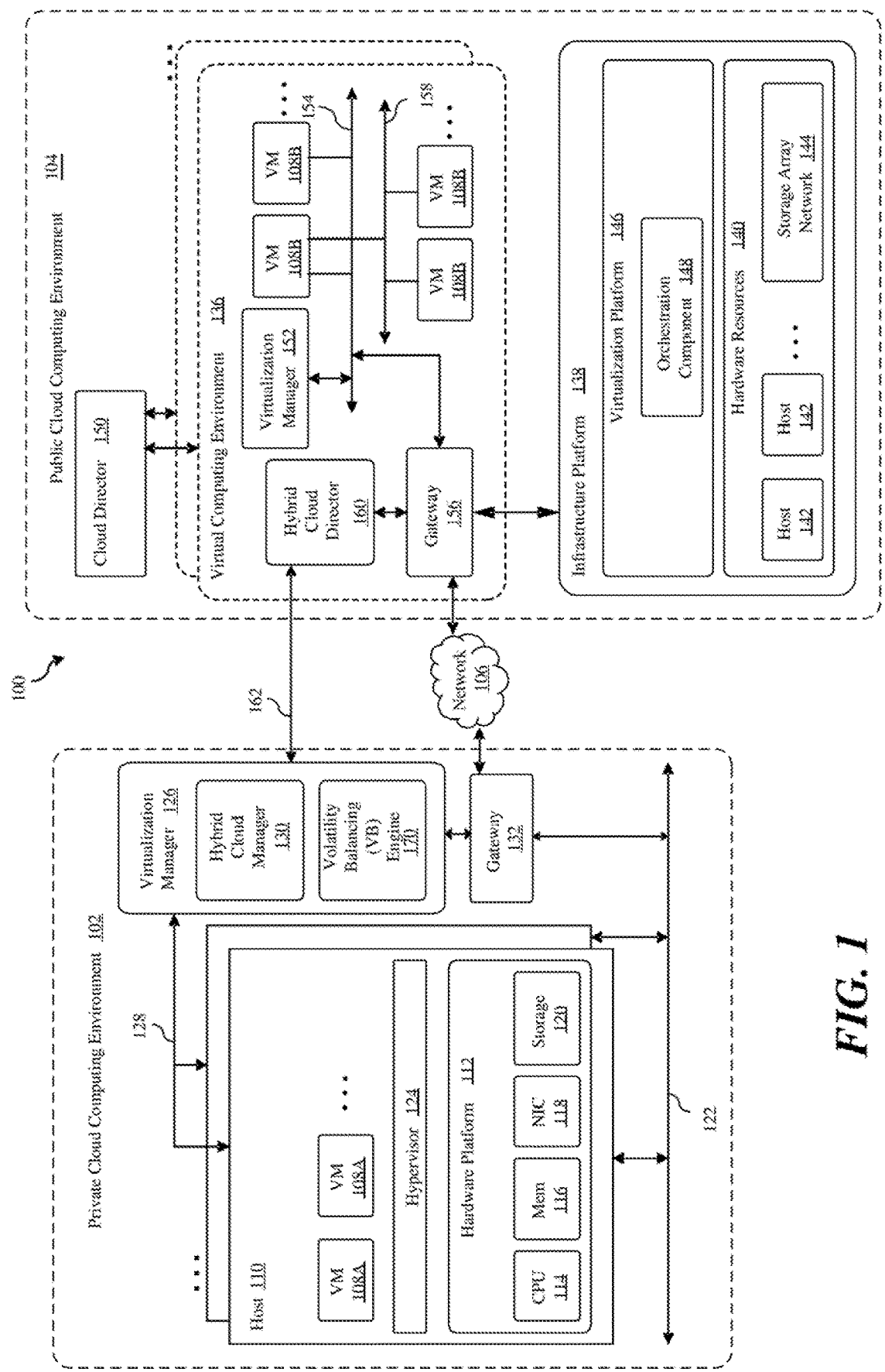
FIG. 1 is a block diagram of a hybrid cloud system that may be used to describe a method and apparatus for volatility management in cloud computing configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments tire presented in drawings the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at: least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

As used herein, the term "workload" (or "load") refers to a metric based on a ratio of computing resources demanded of a computing object versus an amount of resources possessed by the computing object. Computing resources may include processing, memory, storage, or network resources, and computing objects may include one or more virtual machines (VM), hosts for VMs, or clusters of hosts. A workload metric may represent, a measurement at a single point in time or a collection of measurements that spans a period of time. Typically, workload may be expressed as a percentage (%) value ranging from 0% (unused) to 100% (full utilization used). However, other expressions may be used. For example, a workload that is greater than 100% may be used to express that a particular computing object is starving for resources because demand for computing resources by that computing object is greater than the computing resources possessed by it. In addition, as used herein the term "volatile" generally refers to an amount of change (i.e., variability) over time of workload. Thus, the more "volatile" a computing object is, more rapid the change of the workload of the computing object is over the same period of time. The term "noise" may be used to refer to an amount of change in workload over time that is generally understood to be relatively high (more volatility). Conversely, the term "stable" may be used to refer to an amount of change over time of workload that is generally understood to be relatively low (less volatility). For example, "noisy" computing objects may have a more rapid change of workload over time than a computing object with less noise, while "stable" computing object may have a slower change of workload over time. It should be understood that, in general, the amount, or period, of time over which different computing nodes are evaluated should be similar for proper comparison. In addition, determination of volatility may also take into consideration magnitudes of change.

More specific, quantifiable definitions of terms follow in this document. However, although specific definitions for certain terms have been, provided in this disclosure, it should be noted that those of ordinary skill in the art would understand that these terms should not be taken to be limiting.

Various aspects of the present invention provide a resource management engine implementing a volatility balancing (VB) process, referred to herein as a "VB engine" to distribute workload volatility across hosts in a cluster (i.e., a group of hosts) that include hosts having unstable workloads. To distribute volatility, instead of performing a one-way VM move, the VB engine may swap a volatile VM with a more stable VM. In one aspect of the present invention, the volatile VM and the stable VIM will be chosen based on workload (e.g., similar workload). The VM engine may ensure that volatility is distributed without affecting workload distribution. Thus, the VB engine may be utilized simultaneously with existing load balancing mechanisms that only distributes workload.

Turning now to FIG. 1, a block diagram of a hybrid cloud system 100 in which the present invention may be implemented in accordance with an embodiment of the invention is shown. The hybrid cloud system 100 includes at least one private cloud Computing environment 102 and which may include at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 and public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a VM, e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing, instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning migrating VMs from one host to another host, and load balancing between the hosts.

In one embodiment, the virtualization manager 126 includes a hybrid cloud manager 130 configured to manage and integrate computing resources provided by the private cloud computing environment 102 with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

In one embodiment, the hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP) load balancing, and virtual private network (VPN) connectivity over the network 106.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment 104 includes an infrastructure platform 138 upon which the virtual computing environments can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform 146 may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 135 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption, levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director 160 may be a component of the HCX-Cloud product and the hybrid cloud manager 130 may be a component of the HCX-Enterprise product, which are provided by VMware, Inc.

Referring still to FIG. 1, in one embodiment the hybrid cloud system 100 includes a VB engine illustrated as a VB engine 170 that may be used for volatility balancing as described herein. Although the VB engine 170 is shown to be included in the virtualization manager 126 in the private cloud computing environment 102 to balance the volatility among hosts such as the host 110, the VB engine 170 may be implemented in another part of the private cloud computing environment 102. In addition, the VB engine may be implemented in the public cloud computing environment 104. Further, multiple instances of a VB engine such as the VB engine 170 may be included so that volatility balancing functionality may be provided in both the private cloud computing environment 102 and the public cloud computing environment 104. Thus, the functionality of the VB engine described herein may be implemented in any computing environment, whether that computing environment is private, public, or hybrid.

In general, the VB engine 170 may consider VMs from two different hosts at a time based on a volatility metric for each host so as to attempt to find a pair of VMs, referred to as a "best VM swap pair," that may be swapped to reduce overall volatility in the cluster. In accordance with one aspect of the present invention, the VB engine will only consider swapping VMs between hosts that are in a particular group, such as a cluster. In other aspects of the present invention, the VB engine may consider swapping VMs between hosts in different clusters.

In one aspect of the present invention, the VB engine 170 will attempt to distribute volatility across all hosts in a group of hosts, such as hosts in a cluster, without necessarily changing workload distribution. A load balancing engine may then be used to balance workloads or otherwise change distribution of workload.

A critical step in distributing volatility is identifying volatility. The VB engine 170 performs this efficiently at both VM and host levels. In one aspect of the present invention, a measure, or metric, of workload volatility of a virtual machine may be defined by a volatility factor (VF):

$$VF(vm) = (Avg_{workload}, \sigma_{workload}), \quad (1)$$

where VF(vm) is the volatility factor for a virtual machine (vm), determined from an avenge ($Avg_{workload}$) and a standard deviation ($\sigma_{workload}$) of workload samples collected for that particular virtual machine. Workload samples may be collected periodically over a period of time. For example, workload samples may be samples collected at every second from the last fifteen (15) minutes. Workload samples may include measurements of one or more of types of resource use, including CPU, network, memory, storage, power, etc. The term "workload metric" may be used to refer to one or more workload samples, including a combination of one or more workload samples. The combination may include different types of workload samples and include any analysis performed thereon. For example, a volatility factor determined from an analysis of workload samples related to CPU and memory use may be considered a wokload metric. As another example, workload metric may refer to a volatility factor that is determined solely on workload samples related to CPU resource use.

In addition to determining a volatility factor of each virtual machine, the VB engine 170 also determines a volatility factor for each host:

$$VF(host) = \Sigma_{i=1}^{n} VF(vm_i) \quad (2)$$

where VF(host) is a volatility factor for a host having n VMs, and VF($vm_i$) is a volatility factor for virtual machine i. Thus, the volatility of a host may be thought of as a sum of the volatility factors of all VMs on that host. The term "volatility factor" may be referred to herein simply as "volatility," unless otherwise noted.

In one aspect of the present invention, although the VB engine 170 may use various metrics (measurement of use of CPU, network, memory, storage, power, etc., resources) in determining volatility (i.e., determining volatility factor), in the example provided herein the VB engine 170 attempts to balance volatility based on CPU and memory-based metrics only. However, those skilled in the art should understand the applicability of the approaches described herein to the use of other metrics. For example, in general, volatility for memory resource use is expected to be minimal in general compared to CPU resource use. Thus, determination of the volatility factor may be based on decreasing order of CPU resource use volatility to achieve a more desirable balance of volatility faster.

Figure 2:
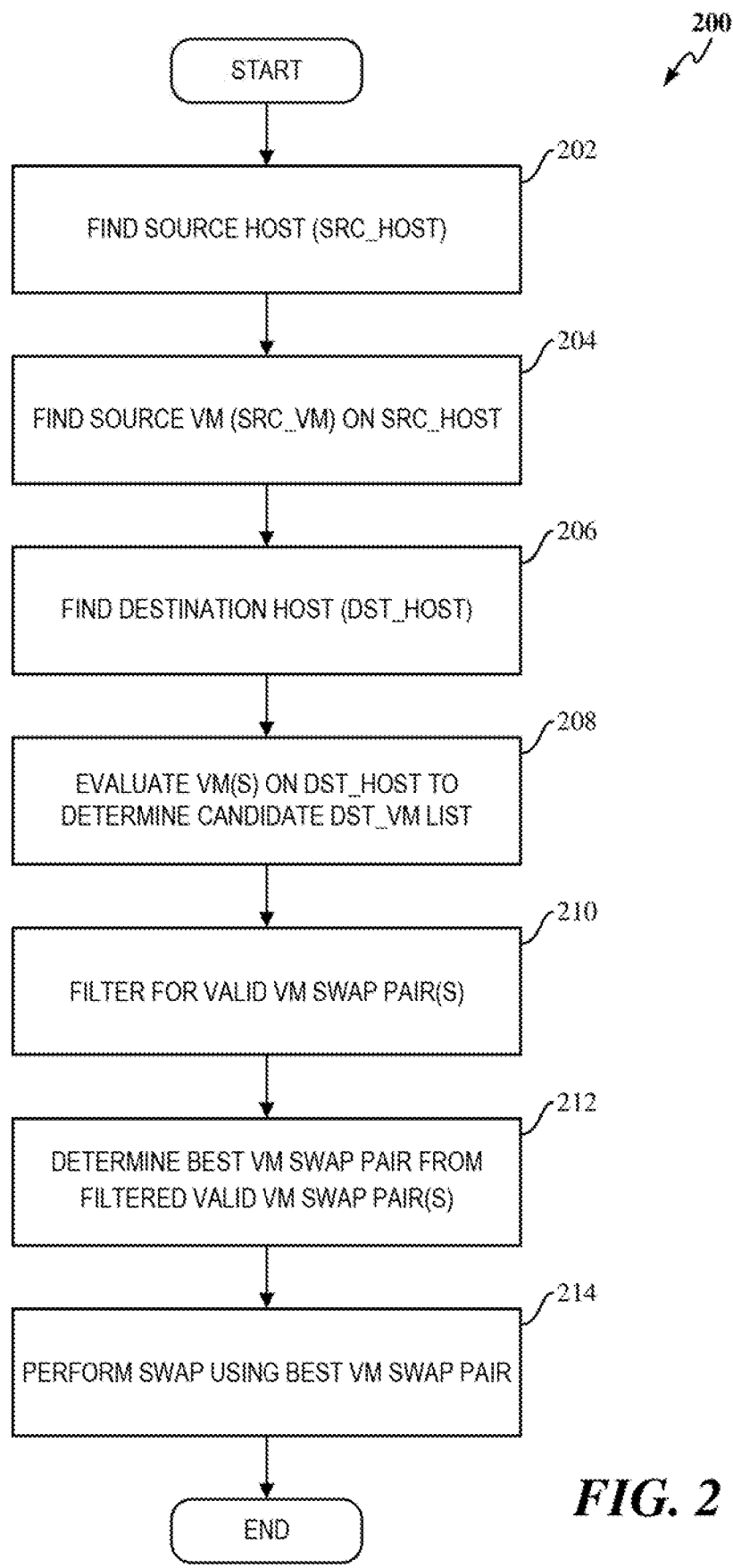
FIG. 2 is a volatility balancing process configured in accordance with various aspects of the invention to balance volatility in a group of hosts in the hybrid cloud system of FIG. 1 by swapping a source VM on a source host with a destination VM on a destination host.

FIG. 2 illustrates an overview of a volatility balancing process 200 configured in accordance with various aspects of the present invention that may be used by the VB engine 170 to find, evaluate, and swap VMs between hosts in a group of hosts (such as all hosts in a cluster). In one embodiment, the volatility balancing process 200 may be configured to swap a pair of VMs that includes a source VM (SRC_VM) on a source host (SRS_HOST) and a destination VM (DST_VM) on a destination host (DST_HOST). As described herein, parts of the volatility balancing process 200 may be performed iteratively. In discussing FIG. 2, reference will also be made to FIGS. 3-5.

At step 202, the source host may be found, or identified. In one embodiment, the source host is a host from the group of hosts that has not been evaluated as a potential host from which a first VM may be identified to be swapped with a second VM on the destination host. The source host is an unvisited host having a volatility factor that is higher than all other unvisited hosts in the group of hosts. In general, each host in the group of hosts will be visited in the order from highest to lowest volatility. Thus, the group of hosts maybe sorted by volatility (i.e., ranked by their host volatility factors) and the host with the highest volatility that has not been visited is used as the source host. As noted, the volatility may be based on volatility of use of CPU resources.

Figure 3:
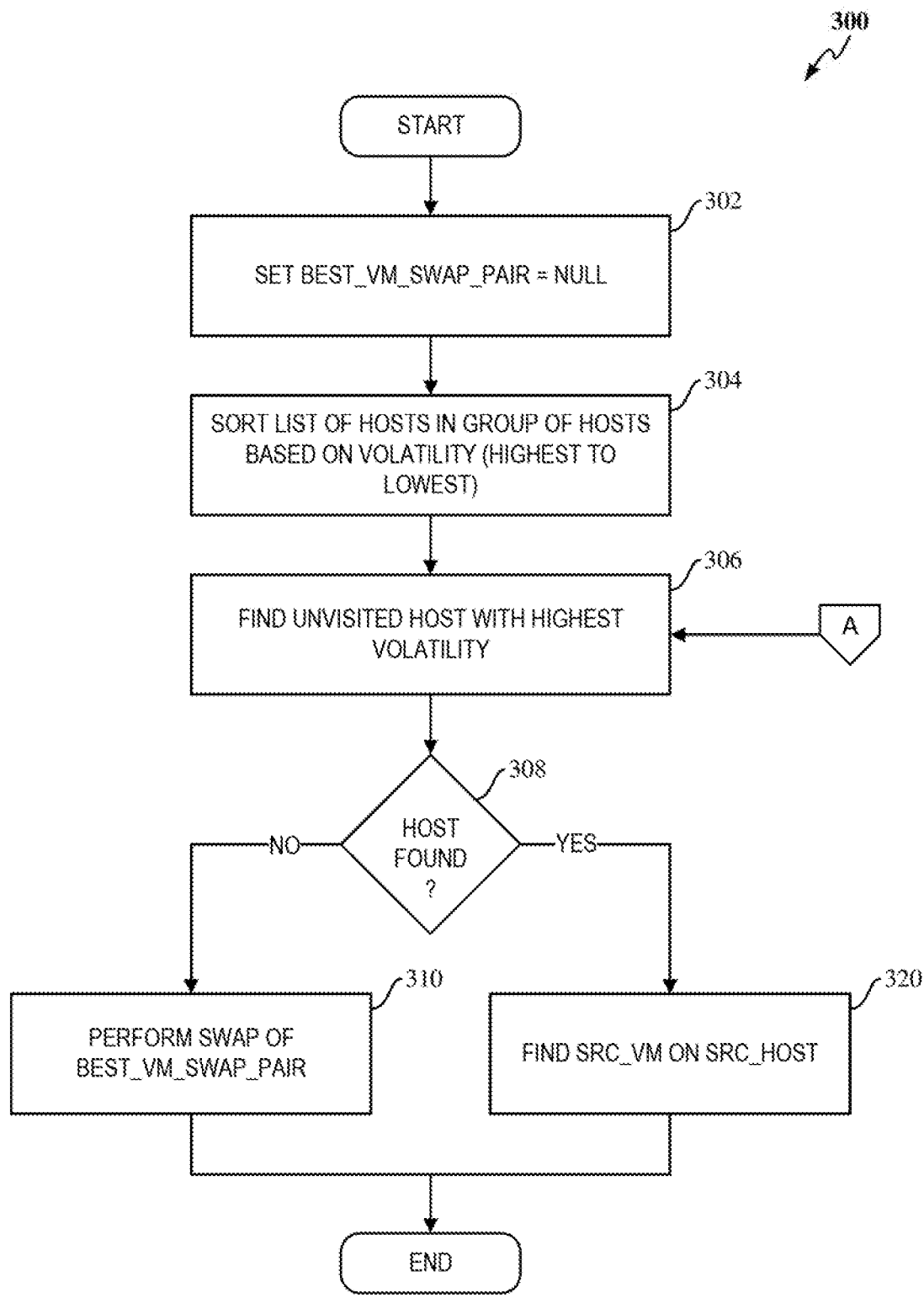
FIG. 3 is a flow diagram of a source host determination process configured in accordance with various aspects of the invention to find the source host for the volatility balancing process of FIG. 2.

FIG. 3 illustrates a source host determination process 300 configured in accordance with various aspect of the present invention that may be used to find the source host in step 202. As used herein, the terms "find," "determine," "identify," and "locate" may be used synonymously. In addition, the terms "visit" and "evaluate" may refer to the same general operation of analyzing a particular entity such as a host or a VM through a process such as the volatility balancing process 200 and processes associated therewith.

At step 302, a variable BEST_VM_SWAP_PAIR that may be used to store the pair of VMs identified as the best pair of VMs to be swapped is initialized, or set, to a value of NULL. Although the term "best" in the name given to the BEST_VM_SWAP_PAIR variable indicates an absoluteness to the optimality of the pair of VMs that are identified by the variable, it should be noted that only after all potential pairs of VMs are considered by the VB engine 170 can the term "best" be considered more or less absolute. Until then, the pair of VMs identified by BEST_VM_SWAP_PAIR are only the best pair identified relative to all other pairs of VMs that have been evaluated. In addition, in certain instances there may not be a pair of VMs that need to be swapped, which means that the BEST_VM_SWAP_PAIR variable would still be NULL. As explained further below, the initialization operation of the variable ensures that if no pair of VMs is identified as needing to be swapped, the VB engine 170 may exit gracefully. After the BEST_VM_SWAP_PAIR has been initialized, operation then continues with step 304.

At step 304, a list of hosts that includes all hosts in a group of hosts is sorted based on volatility. In one aspect of the present invention, the list of hosts may be sorted by CPU-based host volatility factors, from highest to lowest volatility. After the list of hosts has been sorted, operation then continues with step 306.

At step 306, an attempt is made to find a host in the list of hosts with the highest volatility that has not been visited previously, in one aspect of the present invention, once all VMs on that host has been evaluated, as further described herein, that host will be considered to have been "visited." In other words, after all suitable VMs on a particular host have been considered as a potential source VM, that host would be excluded from the list of hosts that will be evaluated to find a potential source host because that host has been visited. After the attempt is made to find an unvisited host in the list of hosts with the highest volatility, then operation continues with step 308.

It should be noted that until all hosts in the list of hosts have been visited, any future subsequent entry point into the source host determination process 300 would occur at "A," as further described herein.

At step 308, it is determined if a host has been found at step 306. In one embodiment, a determination may be made to see if any hosts in the list of hosts remain unvisited. If all hosts in the list of hosts have been visited, then operation continues with step 310. Otherwise, if an unvisited host with the highest volatility in the list of hosts exists, then operation continues with step 320.

At step 310, if there is no unvisited host found, as determined at step 308, then the pair of VMs currently identified as the best swap pair, as stored in BEST_VM_SWAP_PAIR, will be swapped. It should be noted that if the BEST_VM_SWAP_PAIR, which was set to NULL at step 302, has not been changed during the volatility balancing process 200, as described herein, then there will effectively be no swap operation performed. This is because the VB engine 170 will not perform a swap when it encounters a NULL value. Conversely, however, if BEST_VM_SWAP_PAIR has been updated with a pair of VMs through evaluations of all hosts/VMs during the volatility balancing process 200, then the VB engine 170 will perform a swap of the pair of VMs. In other words, through iteration of evaluating hosts/VMs during the volatility balancing process 200, once no more hosts/VMs are to be considered, BEST_VM_SWAP_PAIR will identify either: (i) no pair of VMs are to be swapped; or (ii) the best pair of VMs to be swapped.

At step 320, once the source host has been found in step 306, evaluation of the VMs on the unvisited host found at step 306 to find the source VM may begin. Thus, continuing to refer to FIG. 2, if a source host is found at step 306, operation continues with step 204.

At step 204, the source VM may be found. In one embodiment, the source VM is a VM from the source host found in step 202 that has not previously been visited. In addition, the source VM is a VM that is more volatile (i.e., has a higher volatility factor) than all other unvisited VMs on the source host.

Figure 4:
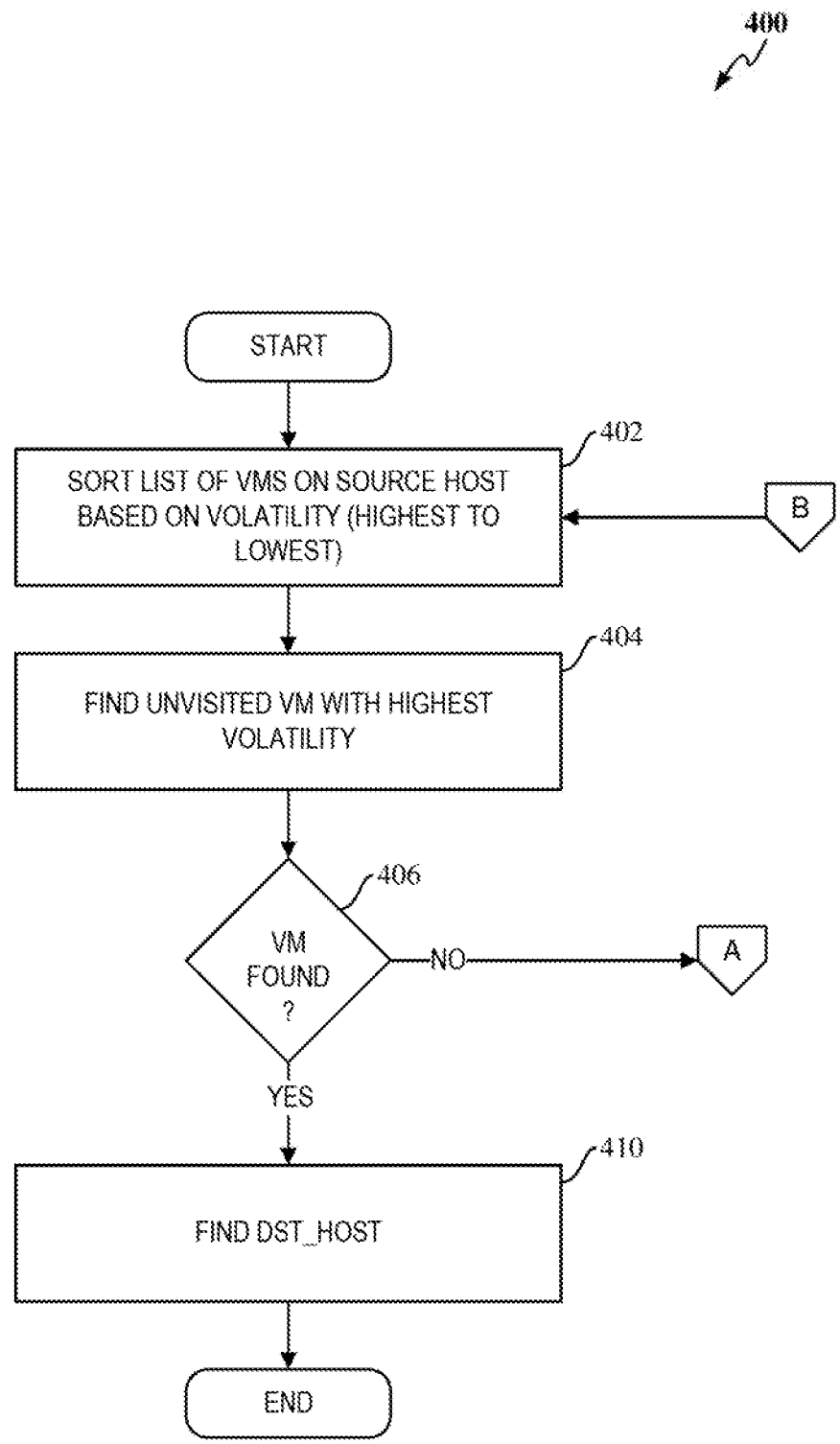
FIG. 4 is a flow diagram of a source VM determination process configured in accordance with various aspects of the invention to find the source VM for the volatility balancing process of FIG. 2.

FIG. 4 illustrates a source VM identification process 400 configured in accordance with various aspect of the present invention that may be used to find the source VM at step 204.

At step 402, a list of VMs that includes all the VMs on the source host found at step 202 is sorted based on volatility. In one aspect of the present invention, the list of VMs is sorted by CPU volatility, from highest volatility to lowest. After the list of VMs has been sorted, operation then continues with step 404.

At step 404, an attempt is made to find a VM in the list of VMs with the highest volatility that has not been visited previously. In one aspect of the present invention, once a VM has been evaluated, as further described herein, that VM will be considered to have been "visited." After the attempt is made to find a host in the list of hosts with the highest volatility that has not been visited previously, then operation continues with step 406.

At step 406, it is determined if a VM has been found at step 404. In one embodiment, a determination may be made to see if any VMs in the list of VMs remain unvisited. If an unvisited VM with the highest volatility in the list of VMs is found, then operation continues with step 410. However, if no unvisited VM in the list of VMs having a highest volatility is found (e.g., all VMs in the list of VMs have been visited but none meet the requisite level of volatility), then operation returns to step 306 in FIG. 3, as designated by the off-page indicator "A". In this latter scenario, the next unvisited host in the list of hosts having the highest volatility may be found (starting the source host determination process 300 at step 306), and the VMs on this next unvisited host, if there is one, are evaluated using the source VM identification process 400.

At step 410, locating a suitable destination VM on a destination host may begin by first finding the destination host. Thus, referring again to FIG. 2, once the source VM is found at step 204, operation continues with step 206.

Figure 5:
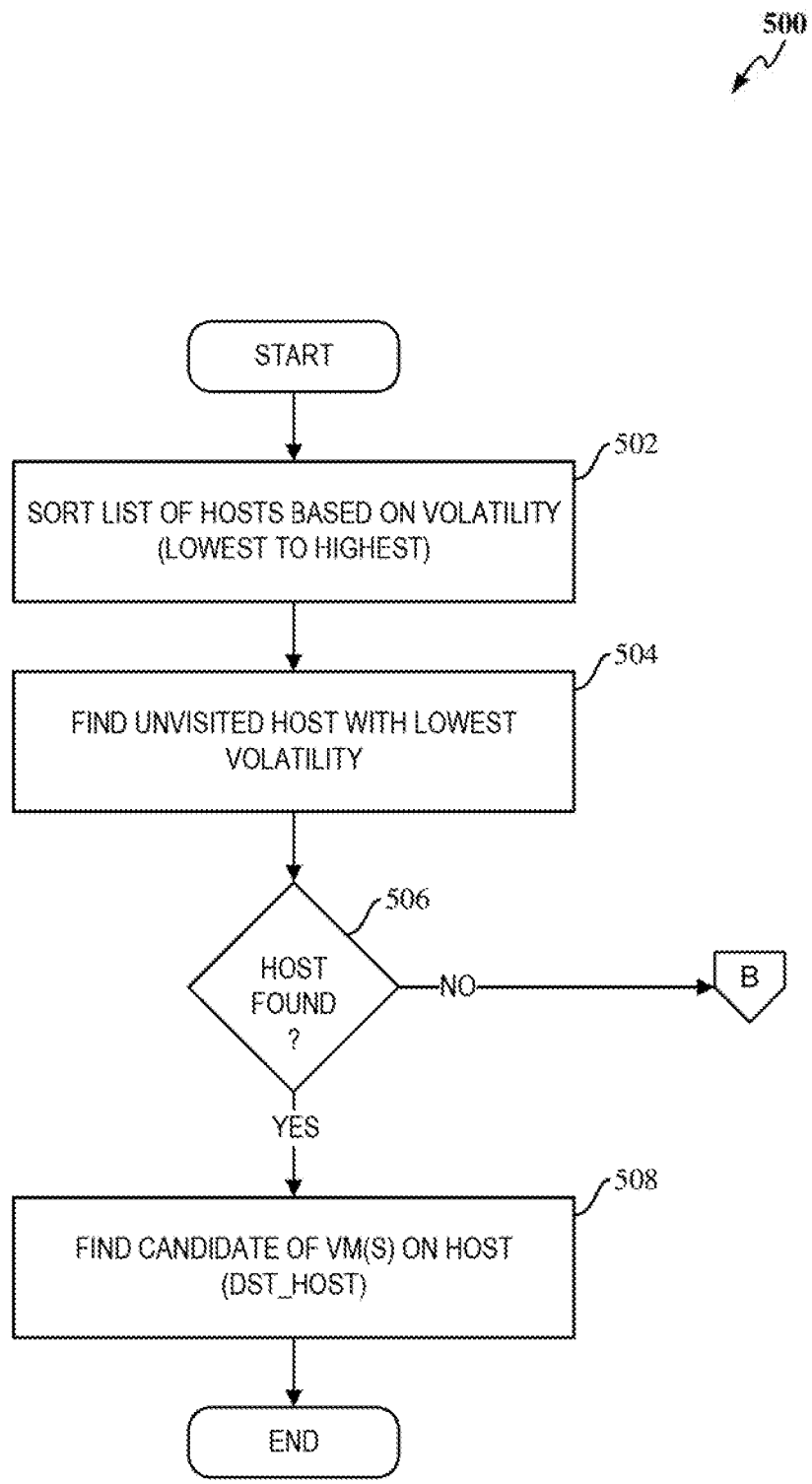
FIG. 5 is a flow diagram of a destination host determination process configured in accordance with various aspects of the invention to find the destination host for the volatility balancing process of FIG. 2.

At step 206, the destination host may be found, where in one embodiment the destination host is a host from the list of hosts that has not been visited as a potential host from which one or more VMs may be identified as a candidate to be swapped with the source VM. FIG. 5 illustrates a destination host determination process 500 configured in accordance with various aspect of the present invention that may be used to find the destination host.

At step 502, the list of hosts that includes all hosts in the group of hosts is sorted based on volatility. In one aspect of the present invention, the list of hosts may be sorted by CPU volatility, from lowest to highest volatility. After the list of hosts has been sorted, operation then continues with step 504.

At step 504, an attempt may be made to find an unvisited host in the list of hosts with the lowest volatility. As discussed above with how the source host may be referenced as being "visited," once all VMs on a host has been evaluated, that host will be considered to have been "visited." In general, each host in the list of hosts will be evaluated in the order from the lowest volatility to the highest, excluding the source host. In one embodiment, the destination host may be an unvisited host having a CPU volatility that is lower than all other unvisited hosts in the list of hosts. Thus, in this case the list of hosts maybe sorted by volatility and then a host with the lowest CPU volatility that has not been visited previously is used as the destination host. After the attempt is made to find an unvisited host in the list of hosts with the lowest volatility, operation continues with step 506.

At step 506, a determination may be made to see if an unvisited host in the list of hosts with the lowest, volatility has been found at step 504. If so, then operation continues with step 508. However, if no host has been found at step 504, such as where all hosts in the list of hosts have been visited, then operation would return to the source VM identification process 400 of FIG. 4 at location "B," which starts at step 402.

At step 508, once it is determined that the destination host has been found at step 506, evaluation of the VMs on the destination host to create a candidate list of destination VMs may begin. Referring again to FIG. 2, operation to do this continues at step 208.

At step 208, a candidate list of destination VMs that can be evaluated to be swapped with the source VM may be determined. In one embodiment, all VMs on the candidate destination host found at step 206 are evaluated for the candidate list of destination VMs using the following:

```
for both cpu and memory:
    diff = |src_host_load − dst_host_load| / 2
    if src_host_load > dst_host_load
        then src_vm_load − dst_vm_load <= diff
    else
        dst_vm_load − src_vm_load <= diff
``` where src_host_load and dst_host_load are the loads of the source host and the destination host, respectively; and src_vm_load and dst_vm_load are the loads of the source VM and the destination VM, respectively. In one embodiment, both CPU and memory loads are taken into consideration. While finding candidate VMs on the destination host, the actual workload on the source host can be greater or less than the workload on the destination host. In one aspect of the present invention, the VB engine 170 will make sure, even after the swap, the actual load difference will remain the same or at least reduced and will not increase. This is for the VB engine 170 to ensure that balancing volatility does not result in more movement of VMs by a load balancer or worsen the cluster state. Once the candidate list of destination VMs is found, operation continues with step 210.

At step 210, a set of valid VM swap pairs may be determined through filtering to ensure balancing CPU volatility does not result in increased memory volatility on the hosts. In one embodiment, for each potential VM swap pair, a sum of standard deviation of CPU volatility and memory volatility for the hosts before and after a swap may be computed. If there is a decrease in the sum after the swap, then the potential VM swap pair may be considered a valid VM swap pair for the set of valid VM swap pairs. Thus:

```
If (std.dev(cpu_volatility_before) + std.dev(mem_volatility_before)
    >
    (std.dev(cpu_volatility_after) + std.dev(mem_volatility_after))
    then
        this is a valid swap pair
``` where std.dev(cpu_volatility_before) and std.dev(cpu_volatility_after) are standard deviations of the CPU volatility of the hosts on which the potential VM swap pair are located before and after the swap if the swap is performed, respectively; and std.dev(mem_volatility_before) and std.dev (mem_volatlity_after) are standard deviations of the memory volatility of the hosts on which the potential VM swap pair are located before and after the swap if the swap is performed, respectively. In another embodiment, even if the memory volatility is increased after the swap but the decrease in CPU volatility is more, the swap may be considered. Once the set of valid VM swap pairs has been determined, operation may continue with step 212.

At step 212, a best VM swap pair from the set of valid VM swap pairs is determined. In one embodiment, a swap pair that results in the lowest standard deviation after a swap may be considered the best swap pair, and in accordance with various aspects of the present invention, both CPU volatility and/or memory volatility may be considered. Once the best VM swap pair has been determined, operation continues with step 214.

At step 214, the VB engine 170 may perform the swap between the source VM on the source host and the destination VM on the destination host. In one embodiment, the swapping of the source VM and the destination VM, which is movement or migration of the source VM from the source host to the destination host, and movement or migration of the destination VM from the destination host to the source host, may occur simultaneously. In another embodiment, each movement may occur sequentially. In either case, it should be understood that the movements do not necessarily need to occur exactly simultaneously, which means the movements do not need to start and/or complete at the same time. Of course, it would be preferable that any movements be completed before the VB engine 170 examines the group of hosts for volatility balancing again. In one implementation, the swapping of the source and destination VMs may be executed using VMware's vMotion technology.

The VB engine 170 may initiate execution of the volatility balancing process 200 based on a variety of schemes. In one aspect of the present invention, the VB engine 170 may examine the volatility of various hosts in the cluster and begin repeating the volatility balancing process 200 when a threshold has been exceeded. In another aspect, the VB engine 170 may operate periodically to balance volatility, without regard to a threshold of volatility that needs to be encountered. For example, the VB engine 170 may operate every five (5) minutes.

FIG. 6 illustrates a chart 600 with an example of utilization distributions before and after the volatility balancing process 200 of FIG. 2 has completed balancing volatility for a group of hosts including host 1, host 2, host 3, and host 4. Before volatility balancing:

Host 1: 4 VMs, each with an average of 12.5% host CPU utilization and 10% noise (VOLATILE)

Host 2: 4 VMs, each with an average of 12.5% host CPU utilization and 1% noise (STABLE)

Host 3: 4 VMs, each an average of 12.5% host CPU utilization and 1% noise (STABLE)

Host 4: 4 VMs, each with an average of 12.5% host CPU utilization and 1% noise (STABLE)

After Volatility balancing, where, for example, the volatility on Host 1 has been distributed over the other hosts by swapping 3 of the VMs of Host 1 with 3 stable VMs from Host 2, Host 3, and Host 4:

Host 1: 1 VM with 10% noise, and 3 VMs with 1% noise

Host 2: 1 VM with 10% noise, and 3 VMs with 1% noise

Host 3: 1 VM with 10% noise, and 3 VMs with 1% noise

Host 4: 1 VM with 10% noise, and 3 VMs with noise

Continuing to refer to FIG. 6 with the above distributions, comparing load percentages before and after volatility balancing using four (4) different scenarios, where a first scenario 602_A is one where all volatile VMs increase in workload; a second scenario 602_B is one where all volatile VMs decrease in workload; a third scenario 602_C is one where half of the volatile VMs increase in workload and the other half decrease in workload; a fourth scenario 602_D is where 3 of the volatile VMs increase in workload and 1 decreases in workload; and a fifth scenario 602_E is where 1 of the volatile VM increases in workload and 3 decrease in workload. In the first 2 out of 5 scenarios (i.e., the first scenario 602_A and the second scenario 602_B), a perfect balance is achieved with the volatility balancing process 200, while distribution of volatility without volatile balancing is disastrous (Host 1 varying in load between 90% in the first scenario 602_A to 10% in the second scenario 602_B).

As noted above, many existing resource management approaches in cloud computing react to imbalances in workload distribution for hosts in a group of hosts by using one-way moves of VMs to different hosts based on current workload usage. The various aspects of the present invention disclosed herein provides a novel management approach by distributing volatility, instead of workload. In one aspect of the present invention, the volatility balancing performs swapping pairs of VMs so that a level of host utilization may be maintained on each host even while volatility is reduced. The volatility balancing approach described herein is unique and effective as it may completely avoid negatively impacting existing workload distribution.

It should be noted that although CPU resource is mainly used in the various examples provided in this disclosure, it should be noted that those of ordinary skill in the art would understand that the various aspects of the present invention may be applied to other types of resources, such as network and storage resources. Further, the various aspects of the present invention may be applied to a combination of resources.

Figure 7:
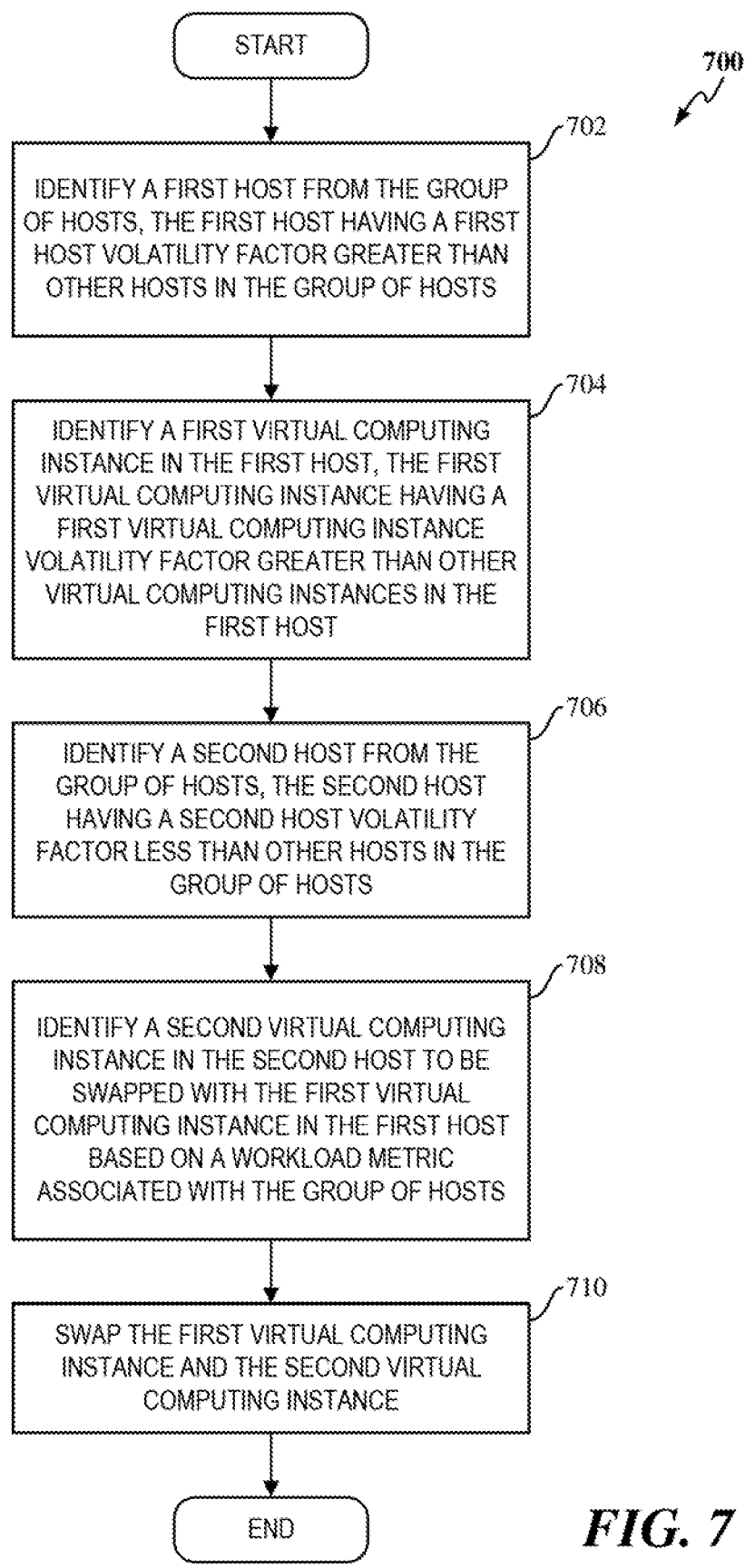
FIG. 7 is a flow diagram of a computer-implemented method for managing workload volatility in a cloud architecture comprising a plurality of virtual computing instances in a group of hosts in accordance with various aspects of the invention.

A computer-implemented method for managing workload volatility in a cloud architecture comprising a plurality of virtual computing instances in a group of hosts in accordance with various aspects of the invention is described with reference to a flow diagram 700 of FIG. 7. At block 702, a first host from the group of hosts is identified, where the first host has a first host volatility factor greater than other hosts in the group of hosts. At block 704, a first virtual computing instance in the first host is identified, where the first virtual computing instance has a first virtual computing instance volatility factor greater than other virtual computing instances in the first host. At block 706, a second host from the group of hosts is identified, the second host having a second host volatility factor less than other hosts in the group of hosts. At block 708, a second virtual computing instance is identified in the second host to be swapped with the first virtual computing instance in the first host based on a workload metric associated with the group of hosts. At block 710, the first virtual computing instance and the second computing instance are swapped so that the first virtual computing instance is migrated from the first host to the second host and the second virtual computing instance is migrated from the second host to the first host.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed:

1. A computer-implemented method for managing workload volatility in a cloud architecture comprising a plurality of virtual computing instances in a group of hosts, the method comprising:
executing the plurality of virtual computing instances on the group of hosts; and
load balancing the plurality of virtual computing instances on the group of hosts where load balancing includes determining, in accordance with predetermined evaluation intervals, a host volatility factor for each host of the group of hosts, wherein each respective host volatility factor is computed using virtual computing instance volatility factors of each respective virtual machine instance executing on a respective host, and each respective virtual computing instance volatility factor is computed using a standard deviation of workload samples collected for each respective virtual computing instance executing on a respective host of the group of hosts;
for each predetermined evaluation interval, performing the steps of:
identifying a first host from the group of hosts, the first host having a first host volatility factor greater than other hosts in the group of hosts wherein the first host volatility factor is computed using virtual computing instance volatility factors of the virtual computing instances in the first host;
identifying a first virtual computing instance in the first host, the first virtual computing instance having a first virtual computing instance volatility factor greater than other virtual computing instances in the first host, wherein the first virtual computing instance volatility factor is computed using a standard deviation of workload samples collected for the first virtual computing instance;
identifying a second host from the group of hosts, the second host having a second host volatility factor less than other hosts in the group of hosts, wherein the second host volatility factor is computed using virtual computing instance volatility factors of the virtual computing instances in the second host;
identifying a second virtual computing instance in the second host to be swapped with the first virtual computing instance in the first host based on a workload metric associated with the group of hosts, wherein the workload metric is derived from an analysis of one or more samples associated with the group of hosts at a particular point in time or a period of time;

swapping the first virtual computing instance and the second virtual computing instance so that the first virtual computing instance is migrated from the first host to the second host and the second virtual computing instance is migrated from the second host to the first host; and executing the first virtual computing instance on the second host and the second virtual computing instance on the first host.

2. The method of claim 1, wherein the workload metric associated with the group of hosts comprises a first workload metric associated with the first host and a second workload metric associated with the second host, wherein the identification of the second virtual computing instance in the second host comprises:

determining a difference between the first workload metric and the second workload metric; and selecting a virtual computing instance from a plurality of virtual computing instances in the second host based on the difference.

3. The method of claim 2, wherein the first virtual computing instance comprises a first virtual computing instance workload metric and the selected virtual computing instance comprises a second virtual computing instance workload metric, wherein the second virtual computing instance workload metric of the selected virtual computing instance is not greater than the first virtual computing instance workload metric of the first virtual computing instance when the first workload metric associated with the first host is higher than the second workload metric associated with the second host.

4. The method of claim 1, wherein the first host volatility factor and the second host volatility factor each comprises a memory volatility factor, wherein the identification of the second virtual computing instance in the second host comprises:

determining a change in the memory volatility factor of each of the first and second hosts assuming a swap of the first virtual computing instance and the second virtual computing instance; and selecting a virtual computing instance from a plurality of virtual computing instances in the second host based on the change.

5. The method of claim 4, wherein the selection of the virtual computing instance from the plurality of virtual computing instances in the second host results in no increase in the memory volatility factor of each of the first and second hosts.

6. The method of claim 1, wherein the identification of the second virtual computing instance in the second host comprises:

determining a change of the first host volatility factor and the second host volatility factor for each potential swap of the first virtual computing instance with each virtual computing instance in a plurality of virtual computing instances in the second host; and selecting a virtual computing instance from the plurality of the computing instances in the second host based on the change.

7. The method of claim 6, wherein the selection of the virtual computing instance from the plurality of the computing instances in the second host maximizes a reduction of a standard deviation of the first host volatility factor and the second host volatility factor.

8. A non-transitory computer-readable storage medium containing program instructions for managing workload volatility in a cloud architecture comprising a plurality of virtual computing instances in a group of hosts, wherein execution of the program instructions by one or more processors causes the one or more processors to perform steps comprising:

executing the plurality of virtual computing instances on the group of hosts; and load balancing the plurality of virtual computing instances on the group of hosts where load balancing includes determining, in accordance with predetermined evaluation intervals, a host volatility factor for each host of the group of hosts, wherein each respective host volatility factor is computed using virtual computing instance volatility factors of each respective virtual machine instance executing on a respective host, and each respective virtual computing instance volatility factor is computed using a standard deviation of workload samples collected for each respective virtual computing instance executing on a respective host of the group of hosts;

for each predetermined evaluation interval, performing the steps of:

identifying a first host from the group of hosts, the first host having a first host volatility factor greater than other hosts in the group of hosts wherein the first host volatility factor is computed using virtual computing instance volatility factors of the virtual computing instances in the first host;

identifying a first virtual computing instance in the first host, the first virtual computing instance having a first virtual computing instance volatility factor greater than other virtual computing instances in the first host, wherein the first virtual computing instance volatility factor is computed using a standard deviation of workload samples collected for the first virtual computing instance;

identifying a second host from the group of hosts, the second host having a second host volatility factor less than other hosts in the group of hosts, wherein the second host volatility factor is computed using virtual computing instance volatility factors of the virtual computing instances in the second host;

identifying a second virtual computing instance in the second host to be swapped with the first virtual computing instance in the first host based on a workload metric associated with the group of hosts, wherein the workload metric is derived from an analysis of one or more samples associated with the group of hosts at a particular point in time or a period of time;

swapping the first virtual computing instance and the second virtual computing instance so that the first virtual computing instance is migrated from the first host to the second host and the second virtual computing instance is migrated from the second host to the first host; and executing the first virtual computing instance on the second host and the second virtual computing instance on the first host.

9. The computer-readable storage medium of claim 8, wherein the workload metric associated with the group of hosts comprises a first workload metric associated with the first host and a second workload metric associated with the second host, wherein the identification of the second virtual computing instance in the second host comprises:

determining a difference between the first workload metric and the second workload metric; and selecting a virtual computing instance from a plurality of virtual computing instances in the second host based on the difference.

10. The computer-readable storage medium of claim 9, wherein the first virtual computing instance comprises a first virtual computing instance workload metric and the selected virtual computing instance comprises a second virtual computing instance workload metric, wherein the second virtual computing instance workload metric of the selected virtual computing instance is not greater than the first virtual computing instance workload metric of the first virtual computing instance when the first workload metric associated with the first host is higher than the second workload metric associated with the second host.

11. The computer-readable storage medium of claim 8, wherein the first host volatility factor and the second host volatility factor each comprises a memory volatility factor, wherein the identification of the second virtual computing instance in the second host comprises:
   determining a change in the memory volatility factor of each of the first and second hosts assuming a swap of the first virtual computing instance and the second virtual computing instance; and
   selecting a virtual computing instance from a plurality of virtual computing instances in the second host based on the change.

12. The computer-readable storage medium of claim 11, wherein the selection of the virtual computing instance from the plurality of virtual computing instances in the second host results in no increase in the memory volatility factor of each of the first and second hosts.

13. The computer-readable storage medium of claim 8, wherein the identification of the second virtual computing instance in the second host comprises:
   determining a change of the first host volatility factor and the second host volatility factor for each potential swap of the first virtual computing instance with each virtual computing instance in a plurality of virtual computing instances in the second host; and
   selecting a virtual computing instance from the plurality of the computing instances in the second host based on the change.

14. The computer-readable storage medium of claim 13, wherein the selection of the virtual computing instance from the plurality of the computing instances in the second host maximizes a reduction of a standard deviation of the first host volatility factor and the second host volatility factor.

15. A system for managing workload volatility in a cloud architecture comprising a plurality of virtual computing instances in a group of hosts, the system comprising:
   memory; and
   one or more processors configured to:
   execute the plurality of virtual computing instances on the group of hosts; and
   load balance the plurality of virtual computing instances on the group of hosts where load balancing includes determining, in accordance with predetermined evaluation intervals, a host volatility factor for each host of the group of hosts, wherein each respective host volatility factor is computed using virtual computing instance volatility factors of each respective virtual machine instance executing on a respective host, and each respective virtual computing instance volatility factor is computed using a standard deviation of workload samples collected for each respective virtual computing instance executing on a respective host of the group of hosts;
   for each predetermined evaluation interval, the processor further configured to:
   identify a first host from the group of hosts, the first host having a first host volatility factor greater than other hosts in the group of hosts wherein the first host volatility factor is computed using virtual computing instance volatility factors of the virtual computing instances in the first host;
   identify a first virtual computing instance in the first host, the first virtual computing instance having a first virtual computing instance volatility factor greater than other virtual computing instances in the first host, wherein the first virtual computing instance volatility factor is computed using a standard deviation of workload samples collected for the first virtual computing instance;
   identify a second host from the group of hosts, the second host having a second host volatility factor less than other hosts in the group of hosts, wherein the second host volatility factor is computed using virtual computing instance volatility factors of the virtual computing instances in the second host;
   identify a second virtual computing instance in the second host to be swapped with the first virtual computing instance in the first host based on a workload metric associated with the group of hosts, wherein the workload metric is derived from an analysis of one or more samples associated with the group of hosts at a particular point in time or a period of time;
   swap the first virtual computing instance and the second virtual computing instance so that the first virtual computing instance is migrated from the first host to the second host and the second virtual computing instance is migrated from the second host to the first host; and
   execute the first virtual computing instance on the second host and the second virtual computing instance on the first host.

16. The system of claim 15, wherein the workload metric associated with the group of hosts comprises a first workload metric associated with the first host and a second workload metric associated with the second host, wherein the identification of the second virtual computing instance in the second host comprises: determining a difference between the first workload metric and the second workload metric; and selecting a virtual computing instance from a plurality of virtual computing instances in the second host based on the difference.

17. The system of claim 16, wherein the first virtual computing instance comprises a first virtual computing instance workload metric and the selected virtual computing instance comprises a second virtual computing instance workload metric, wherein the second virtual computing instance workload metric of the selected virtual computing instance is not greater than the first virtual computing instance workload metric of the first virtual computing instance when the first workload metric associated with the first host is higher than the second workload metric associated with the second host.

18. The system of claim 15, wherein the first host volatility factor and the second host volatility factor each comprises a memory volatility factor, wherein the identification of the second virtual computing instance in the second host comprises:
- determining a change in the memory volatility factor of each of the first and second hosts assuming a swap of the first virtual computing instance and the second virtual computing instance; and
- selecting a virtual computing instance from a plurality of virtual computing instances in the second host based on the change.

19. The system of claim 15, wherein the identification of the second virtual computing instance in the second host comprises:
- determining a change of the first host volatility factor and the second host volatility factor for each potential swap of the first virtual computing instance with each virtual computing instance in a plurality of virtual computing instances in the second host; and
- selecting a virtual computing instance from the plurality of the computing instances in the second host based on the change.

20. The system of claim 19, wherein the selection of the virtual computing instance from the plurality of the computing instances in the second host maximizes a reduction of a standard deviation of the first host volatility factor and the second host volatility factor.

* * * * *